(12) United States Patent
Pitzer

(10) Patent No.: US 6,769,308 B1
(45) Date of Patent: Aug. 3, 2004

(54) LOW-COST STAINLESS STEEL PRESSURE SENSOR ASSEMBLY FOR A PNEUMATIC VALVE

(75) Inventor: Paul J. Pitzer, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 68 days.

(21) Appl. No.: 09/667,849

(22) Filed: Sep. 22, 2000

(51) Int. Cl.$^7$ .............................. G01L 7/08; G01L 7/00
(52) U.S. Cl. ............................. 73/715; 73/700; 73/706; 73/756; 73/717
(58) Field of Search .......................... 73/715, 717, 727, 73/756, 146, 714, 706; 338/39, 42; 137/226, 240

(56) References Cited

U.S. PATENT DOCUMENTS

| | | | |
|---|---|---|---|
| 3,574,284 A | * 4/1971 | Thordarson | 73/406 |
| 3,675,674 A | * 7/1972 | Brown | 137/244 |
| 4,136,560 A | * 1/1979 | Gellos | 73/146.8 |
| 4,449,112 A | * 5/1984 | Gould | 338/39 |
| 4,546,785 A | * 10/1985 | Sanderford | 137/85 |
| 4,694,273 A | * 9/1987 | Franchino | 340/58 |
| 5,212,989 A | * 5/1993 | Kodama et al. | 73/706 |
| 5,939,637 A | 8/1999 | Pitzer et al. | 73/715 |
| 6,050,147 A | 4/2000 | Viduya et al. | 73/756 |

* cited by examiner

*Primary Examiner*—Andrew H. Hirshfeld
*Assistant Examiner*—Marissa Ferguson
(74) *Attorney, Agent, or Firm*—Jimmy L. Funke; Stefan V. Chmielewski

(57) ABSTRACT

An improved low-cost pressure sensor assembly incorporates a stainless steel sensor element welded to an outboard face of a stainless steel insert captured in a low-cost metal pressure port adapted for attachment to a pneumatic valve. The pressure port includes outboard and inboard cavities separated by neck portion; the stainless steel insert is captured in the outboard cavity, while the inboard cavity is adapted for attachment to the pneumatic valve. The stainless steel insert includes a base portion that seats against an O-ring in a floor of the outboard cavity, and a stem portion within the O-ring that extends axially through the neck portion of the pressure port and into its inboard cavity. The insert has a first bore that extends axially from its outboard face into, but not through, the stem portion, and a second bore that intersects the first bore and opens into the inboard cavity of the pressure port. When the pressure port is attached to the pneumatic valve, the stem portion of the insert depresses a spring-biased plunger that opens the valve, and fluid (gas or liquid) escaping through the open valve is placed in direct communication with the sensor element via the first and second bores of the stainless steel insert.

3 Claims, 3 Drawing Sheets

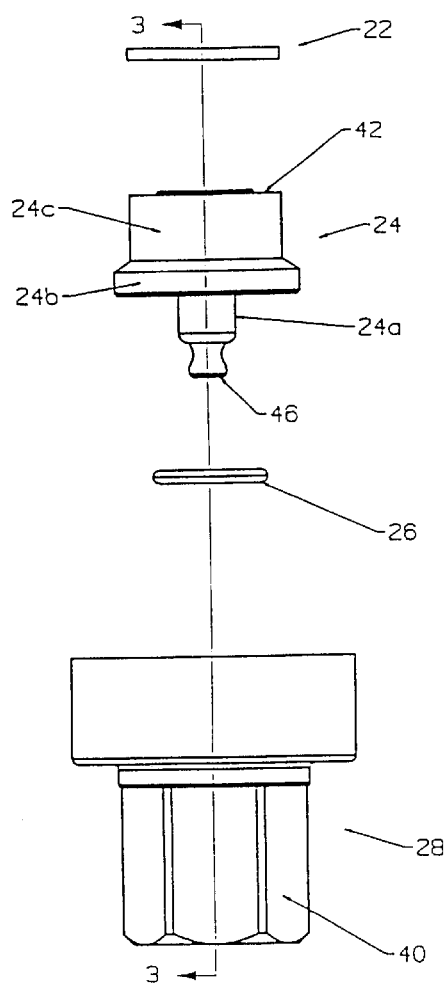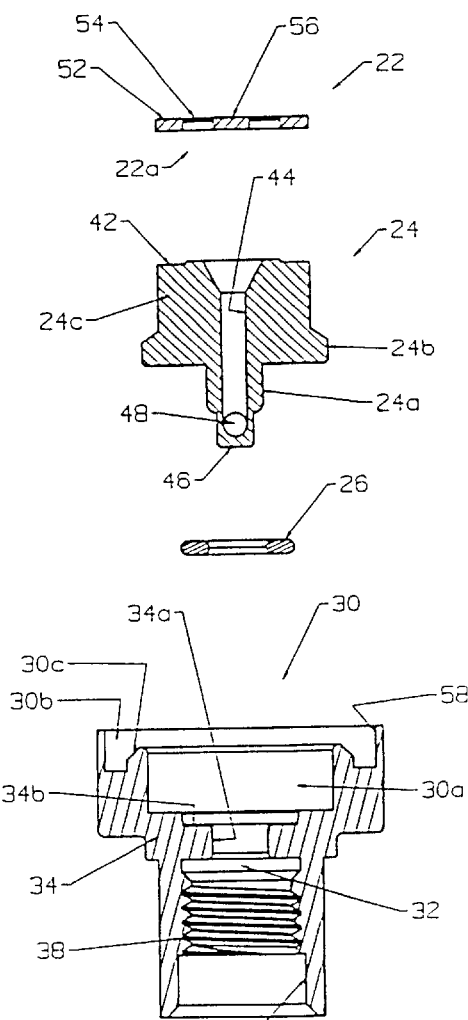
Figure 2
Figure 3

LOW-COST STAINLESS STEEL PRESSURE SENSOR ASSEMBLY FOR A PNEUMATIC VALVE

TECHNICAL FIELD

This invention relates to a low-cost pressure sensor assembly incorporating a stainless steel sensor element for attachment to a pneumatic valve.

BACKGROUND OF THE INVENTION

Stainless steel pressure sensor technology has been successfully utilized in automotive applications involving high pressure fluids such as engine oil, brake fluid, and so on. The sensor element is usually formed as a shallow cylinder, closed at one end to define a diaphragm, and is welded to a pressure port adapted for attachment to a pressure vessel by a threaded fitting or the like such that the fluid contained by the vessel contacts the inboard side of the sensor diaphragm. Piezo-resistive elements formed on the outboard side of the diaphragm exhibit an electrical resistance variation corresponding to deflection of the diaphragm by the fluid pressure, and signal-conditioning circuitry responsive to the sensor element resistance develops an electrical signal representative of the fluid pressure. To permit welding of the stainless steel sensor element to the pressure port, the pressure port is usually also formed of stainless steel material. However, since weldable stainless steel material is relatively expensive and difficult to machine, it has been suggested to utilize a multi-piece assembly that minimizes the stainless steel content. See, for example, the U.S. Pat. Nos. 6,050,147, issued on Apr. 18, 2000, and 5,939,637, issued on Aug. 17, 1999, both of which are assigned to the assignee of the present invention. In the U.S. Pat. No. 6,050,147, the sensor element is welded to a stainless steel pressure port having a central axial bore, and a low-cost metal casing is attached to the stainless steel pressure port by means of an interlocking press-fit. In the U.S. Pat. No. 5,939,637, the sensor element is welded to a stainless steel insert having a central axial bore, where the insert is captured in a low-cost metal pressure port, and an O-ring is compressed between the insert and pressure port to provide sealing therebetween.

Despite being cost-effective, the above-referenced pressure sensor assemblies are not directly adaptable for usage in connection with a pneumatic valve having a spring-biased valve plunger. In such an application, a central stem or boss is required to depress the plunger as the pressure sensor assembly is attached to the valve, and such requirement is incompatible with a central axial bore. Accordingly, what is needed is a low-cost stainless steel pressure sensor assembly that is adapted to be attached to a pneumatic valve having a spring-biased plunger.

SUMMARY OF THE INVENTION

The present invention is directed to an improved low-cost pressure sensor assembly in which a stainless steel sensor element is welded to an outboard face of a stainless steel insert captured in a low-cost metal pressure port adapted for attachment to a pneumatic valve. The pressure port includes outboard and inboard cavities separated by neck portion. The stainless steel insert is captured in the outboard cavity, while the inboard cavity is adapted for attachment to the pneumatic valve. The stainless steel insert includes a base portion that seats against an O-ring in a floor of the outboard cavity, and a stem portion within the O-ring that extends axially through the neck portion of the pressure port and into its inboard cavity. The insert has a first bore that extends axially from its outboard face into, but not through, the stem portion, and a second bore that intersects the first bore and opens into the inboard cavity of the pressure port. When the pressure port is attached to the pneumatic valve, the stem portion of the insert depresses a spring-biased plunger that opens the valve, and fluid (gas or liquid) escaping through the open valve is placed in direct communication with the sensor element via the first and second bores of the stainless steel insert.

BRIEF DESCRIPTION OF THE DRAWINGS

The above and other advantages of the invention will become more apparent from the following description taken in conjunction with the accompanying drawings wherein like references refer to like parts and wherein:

FIG. 2 is an elevational exploded view of the pressure sensor assembly of FIG. 1;

FIG. 3 is a crossectional exploded view of the pressure sensor assembly, taken along the lines 3—3 of FIG. 2;

DESCRIPTION OF THE PREFERRED EMBODIMENT

Figure 5:
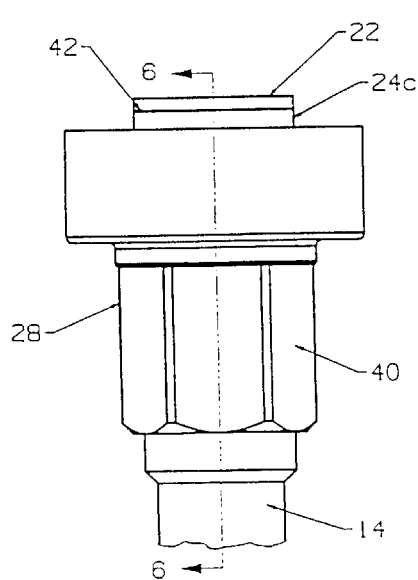
FIG. 5 is an elevational view of the fully assembled pressure sensor assembly according to this invention attached to a pneumatic valve.
Figure 6:
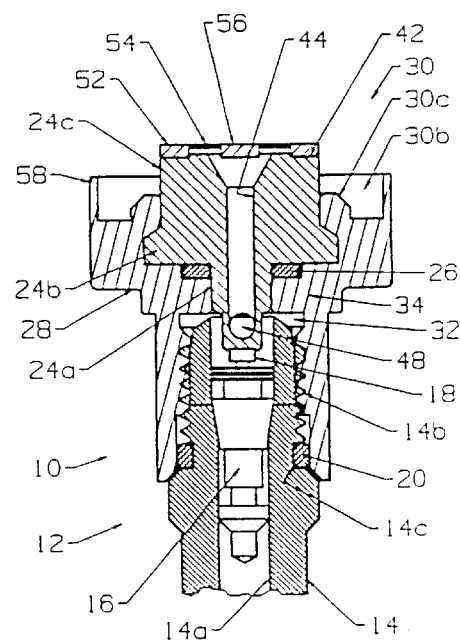
FIG. 6 is a crossectional view of the fully assembled pressure sensor assembly, taken along lines 6—6 in FIG. 5.

FIGS. 1–7 variously depict a pressure sensor assembly 10 according to this invention. The pressure sensor assembly 10 is adapted for attachment to a standard pneumatic valve 12, also referred to in the art as a Schrader valve. As generally illustrated in FIG. 6, the pneumatic valve 12 includes a valve stem 14 mounted on a pressure vessel (not shown), and a valve assembly 16 secured in a central axial bore 14a of the stem 14. For example, the valve stem 14 may be mounted on an automotive air conditioning refrigerant conduit for the purpose of measuring refrigerant pressure and/or transferring refrigerant to or from the conduit. The valve assembly 16 has an internal valve element (not shown) that is coupled to an axially moveable plunger 18. Typically, the valve element is spring biased to a closed position, and is moved to an open position by depressing plunger 18 to the position shown in FIG. 6. The pressure sensor assembly 10 is attached to stem 14 by means of its threaded exterior periphery 14b, and an O-ring 20 captured in an exterior annular recess 14c provides sealing between the stem 14 and pressure sensor assembly 10.

Figure 1:
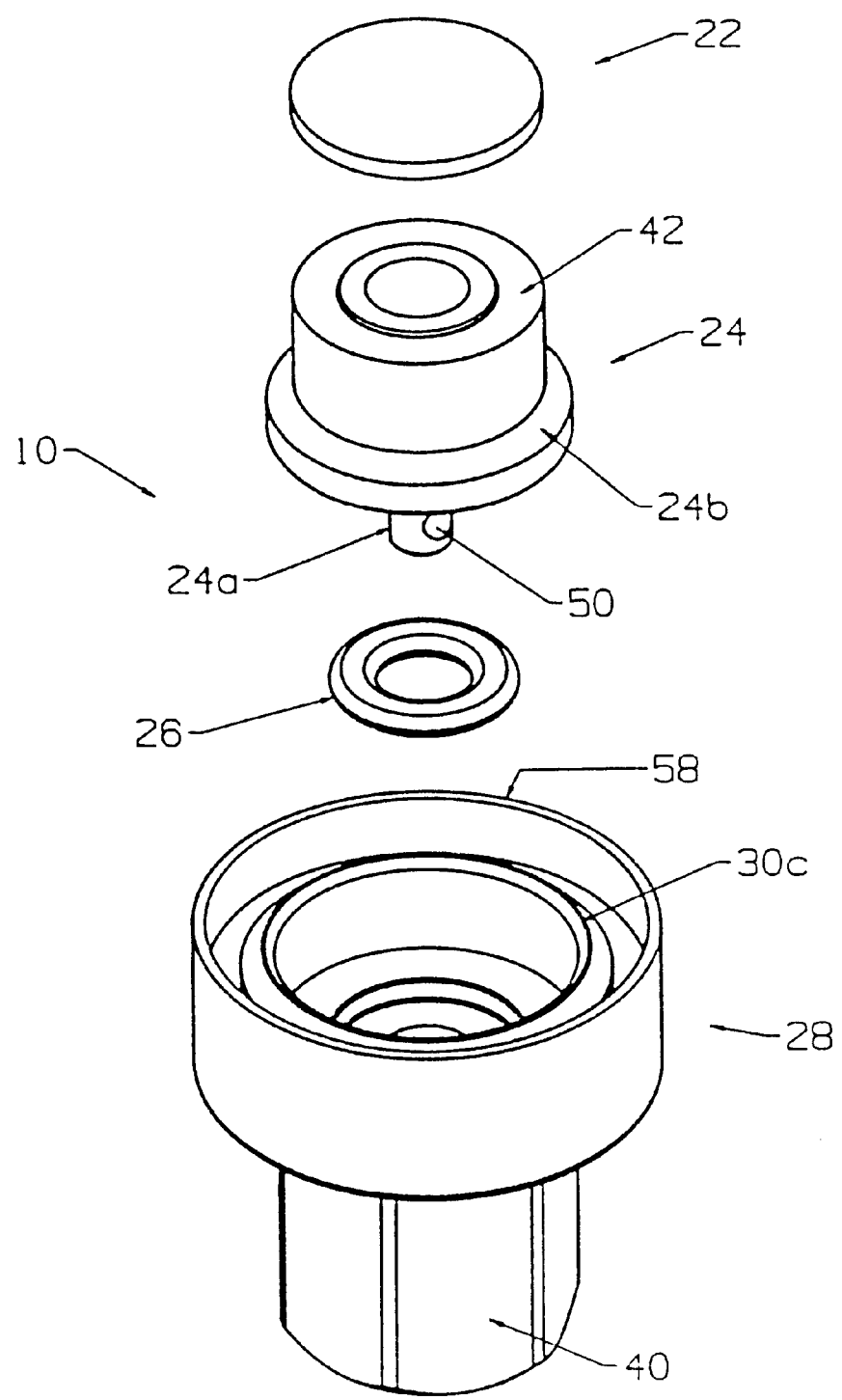
FIG. 1 is an exploded isometric view of a pressure sensor assembly according to the invention.
Figure 4:
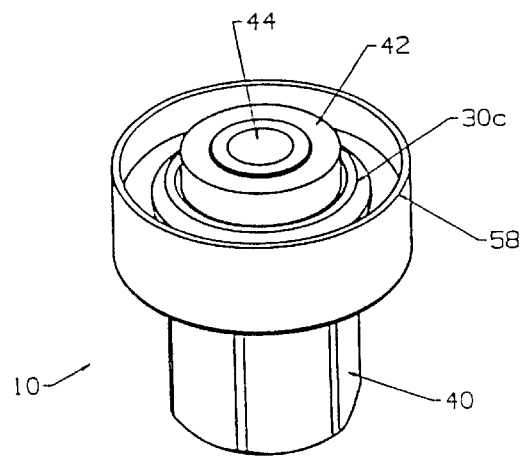
FIG. 4 is an isometric view of an assembled pressure sensor assembly according to this invention, less the pressure sensor element.
Figure 7:
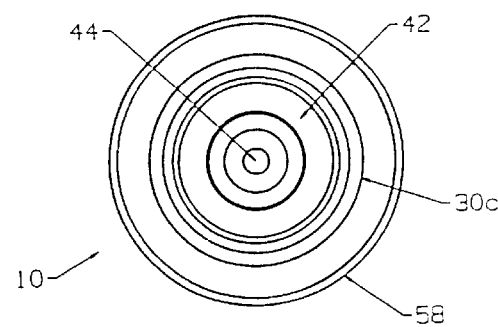
FIG. 7 is a top view of the pressure sensor assembly of FIG. 4.

As best seen in FIGS. 1–3, the pressure sensor assembly 10 comprises a stainless steel sensor element 22, an insert 24, an O-ring 26, and a pressure port 28. The pressure port 28 is formed of inexpensive cold rolled steel, whereas insert 24 is formed of stainless steel (preferably 304 or 316 stainless steel for weldability) so that the sensor element 22 can be easily welded to it. As best seen in FIG. 3, the pressure port 28 has a pair of cavities 30, 32 separated by a neck portion 34. The lower cavity 32 (as viewed in FIG. 3) is configured for attachment to the exterior periphery of valve stem 14 as illustrated in FIG. 6, whereas the upper cavity 30 is configured to receive the insert 24 as described below. Accordingly, the upper cavity 30 is sometimes referred to herein as the outboard cavity, whereas the lower cavity 32 is referred to as the inboard cavity. As best seen in FIGS. 3 and 6, the neck portion 34 of pressure port 28 has a central axial bore 34a for receiving a stem portion 24a of insert 24 and an annular recess 34b for receiving the O-ring 26.

As best seen in reference to FIGS. 3 and 6, the periphery of inboard cavity 32 has a smooth wall portion 36 for engaging and sealing against the O-ring 20 of pneumatic valve 12, and a threaded wall portion 38 for meshing engagement with the threaded exterior periphery 14b of valve stem 14. As best seen in FIGS. 1, 2, 4, and 5, the inboard cavity 32 preferably has a hex-shaped exterior periphery 40 for engagement by a tool (not shown) when the pressure sensor assembly 10 is installed in or removed from the pneumatic valve 12.

As best seen in FIGS. 3 and 6, the outboard cavity 30 of pressure port 28 has a central compartment 30a for receiving the insert 24 and an annular compartment 30b surrounding the central compartment 30a for receiving a cover and terminal assembly (not shown). Once the insert 24 is inserted in central compartment 30a, the cylindrical wall 30c dividing the compartments 30a and 30b is deformed against a base portion 24b of insert 24 (as best seen in FIG. 6) to securely retain insert 24 within central compartment 30a.

The insert 24 has a stem portion 24a, a base portion 24b, and a neck portion 24c. As mentioned above, the stem portion 24a is received within the central axial bore 34a of pressure port 28, while the base portion 24b is received within the central compartment 30a of outboard cavity 30. The base portion 24b encloses the annular recess 34b so as to compress the O-ring 26 between the insert 24 and neck portion 34 of pressure port 28. The neck portion 24c is partially disposed within the central compartment 30a, and extends out of cavity 30 as best seen in FIGS. 5–6 to form a pedestal 42 to which the sensor element 22 is welded. The insert 24 also has a partial central axial bore 44 which extends completely through the base and neck portions 24b, 24c and partially through the stem portion 24a, leaving no axial opening in the inboard end 46 of stem portion 24a. As seen in FIGS. 1, 3 and 6, the stem portion 24a also includes a lateral bore 48 that intersects the central axial bore 44, the lateral bore 48 having at least one opening 50 in stem portion 24a within inboard cavity 32 of pressure port 28—that is, inboard of the neck portion 34. Thus, the two bores 44, 48 form a passage coupling the inboard cavity 32 of pressure port 28 to the inboard face 22a of pressure sensor element 22.

The stainless steel pressure sensor element 22 may be conventional in construction, comprising a cylindrical wall 52 and a thin diaphragm 54 with a central mass 56. The sensor wall 52 is seated on the periphery of pedestal 42 so that the mass 56 is axially aligned with the central axial bore 44. The sensor element 22 is welded onto the pedestal 42 by a laser or electron beam welder to provide a hermetic seal. A good weld is possible due to the stainless steel composition of both insert 24 and sensor 22. Stress sensitive elements formed on the exposed surface of diaphragm 54 between the mass 56 and the wall 52, and connected in a bridge arrangement, have a resistance characteristic that changes with the pressure coupled to the inboard face 22a of sensor 22 through the bores 44, 48. These elements are coupled (by wire bonding, for example) to an integrated circuit chip (not shown), which may be mounted on the outer surface of diaphragm 54 opposite central mass 56. The integrated circuit detects and amplifies the resistance variations due to the sensed pressure, and provides an electrical signal output indicative of the sensed pressure. A plastic terminal assembly (not shown) with terminal pins coupled to the integrated circuit is seated in the annular compartment 30b, retained by a peripheral flange 58 of outboard cavity 30, and is secured thereon to complete the pressure sensor assembly 10.

When the pressure sensor assembly 10 is affixed to the pneumatic valve 12, the threaded surfaces 14b, 38 mesh to provide a mechanical coupling, the O-ring 20 provides a seal between the inboard cavity 32 and valve stem 14, and the inboard end 46 of insert neck portion 24a engages and depresses the valve plunger 18 to open the internal valve element of valve assembly 16. This provides a secure and leak-proof coupling between the central bore 14a of valve stem 14 and the underside surface 22a of sensor element 22 via the internal valve element and the bores 44 and 48. While the pressure sensor assembly 10 has been described in reference to the illustrated embodiment, it will be understood that various modifications will occur to those skilled in the art. For example, the surface 40 may be other than hex-shaped, and may be provided on the exterior periphery of outboard cavity 30 instead of inboard cavity 32, if desired. Also, the lateral bore 48 may be perpendicular to the axial bore 44 as shown, or may be drilled at an oblique angle with respect to axial bore 44. Thus, it will be understood that sensor assemblies incorporating these and other modifications may fall within the scope of this invention, which is defined by the appended claims.

What is claimed is:

1. A pressure sensor assembly for attachment to a pneumatic valve having a depressible plunger, comprising:
    a pressure port having outboard and inboard cavities coupled by a central axial passage, the inboard cavity having an internal threaded surface for attachment to an exterior periphery of said pneumatic valve;
    an O-ring disposed in said outboard cavity;
    a stainless steel insert captured within said outboard cavity and sealed against a floor of said outboard cavity by said O-ring, a stem portion that extends through said axial passage and into said inboard cavity, depressing the plunger of said pneumatic valve, a first bore extending axially from an outboard face of said insert into, but not through, said stem portion, and a second bore intersecting the first bore and opening into said inboard cavity; and
    a stainless steel pressure sensor element welded to the outboard face of said insert, placing an interior periphery of the pneumatic valve in direct communication with the sensor element by way of the first and second bores of the stainless steel insert.

2. The pressure sensor assembly of claim 1, wherein the second bore is perpendicular to the first bore.

3. The pressure sensor assembly of claim 1, wherein said O-ring is disposed in a central annular recess in the floor of said outboard cavity, and the stem portion of said insert extends through said O-ring.

* * * * *